United States Patent
Bremer et al.

(12)

(10) Patent No.: US 6,307,923 B1
(45) Date of Patent: *Oct. 23, 2001

(54) APPARATUS AND METHOD FOR USER TONE NOTIFICATION DURING DATA SUSPENSION OR DEGRADATION

(75) Inventors: Gordon Bremer, Clearwater; Ed Thoenes, St. Petersburg, both of FL (US)

(73) Assignee: Paradyne Corporation, Largo, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/487,699

(22) Filed: Jan. 19, 2000

Related U.S. Application Data

(62) Division of application No. 09/014,748, filed on Jan. 28, 1998.
(60) Provisional application No. 60/039,432, filed on Feb. 26, 1997.

(51) Int. Cl.[7] ............................. H04M 11/00; H04M 1/00
(52) U.S. Cl. ................................ 379/106.08; 379/93.08; 379/377
(58) Field of Search .................. 379/93.05, 93.08–93.09, 379/93.34–93.35, 100.12, 100.15–100.17, 106.05, 106.08–106.09, 188, 196–198, 215, 229–231, 164, 100.06, 396–397, 399, 377; 370/229, 235–236, 253; 358/441–443

(56) References Cited

U.S. PATENT DOCUMENTS

| | | | |
|---|---|---|---|
| 4,995,074 | 2/1991 | Goldman et al. | 379/93.35 |
| 5,502,760 | 3/1996 | Gilbert et al. | 379/93.05 |
| 5,651,060 | 7/1997 | Cohn et al. | 379/215 |
| 5,706,336 | 1/1998 | Kikinis | 379/93.35 |
| 6,031,897 | * 2/2000 | Bremer et al. | 379/106.08 |

* cited by examiner

Primary Examiner—Duc Nguyen
Assistant Examiner—George Eng
(74) Attorney, Agent, or Firm—Thomas, Kayden, Horstemeyer & Risley, L.L.P.

(57) ABSTRACT

Apparatus and method for generating user warning signal during data transmission suspension or degradation, that allows an user to identify that parallel operation of plain old telephone system (POTS) and digital data communications equipment is either occurring or being attempted. More particularly, the user signal warning indicates the impact to the operation of a multiple channel data communications device as a result of the parallel operation with the POTS equipment. A multiple variable signal alerts the user to the parallel operation, the amount of degradation, the elapsed time of the degradation to data communications, and which user site is causing the degradation by the direction of the data traffic being impacted.

32 Claims, 16 Drawing Sheets

APPARATUS AND METHOD FOR USER TONE NOTIFICATION DURING DATA SUSPENSION OR DEGRADATION

CLAIM OF PRIORITY

This application is a Divisional of U.S. patent application Ser. No. 09/014,748, filed on Jan. 28, 1998, and entitled APPARATUS AND METHOD FOR USER TONE WARNING DURING DATA SUSPENSION OR DEGRADATION and also claim benefit to Provisional Application 60/039,432 filed Feb. 26, 1997, which is entirely incorporated herein by reference.

FIELD OF THE INVENTION

The present invention generally relates to an apparatus and method for generating user warning signal during data transmission suspension or degradation. This notifies a user that parallel operation of plain old telephone system (POTS) equipment and digital data communications equipment is either occurring or being attempted. More particularly, the user warning signal indicates the impact to the operation of a multiple channel data communications device, as a result of the operation with the POTS equipment. A multiple variable signal alerts the user to the parallel operation, the amount of degradation, the elapsed time of the degradation to data communications, and the direction of the data traffic being impacted.

BACKGROUND OF THE INVENTION

As known in the art, some modems can operate simultaneously with POTS traffic on the same wire pair communication chapel, e.g., Radish Alternating Voice Data modem, ADSL (POTS Splitter) or V.61 (Simultaneous Voice and Data over POTS).

However, modems that currently operate simultaneously with POTS traffic either combine a digital data signal and the analog POTS signal into one complex analog signal that is then transmitted over the line (as in V.61) or separate the data and POTS in frequency (as in ADSL). So that while these modems simultaneously transmit both data and POTS traffic, they do so in a single signal. While there is a need for modems that transmit data signals in parallel with analog POTS signals, there is also a need to indicate to a user of the analog POTS signal generating equipment that transmission of a POTS signal is affecting transmission of a data communication signal operating in parallel.

Heretofore, modems have lacked the ability to indicate the impact of attempted or occurring parallel POTS and Data traffic. Accordingly, there is a need to develop a modem having the ability to identify whether parallel operation of POTS and data communications device may be limiting the achievable data rate of the modem, and then notify the user that parallel operation is occurring. With such a notification, a user or data communications device can decide to terminate the digital data communication, terminate the POTS traffic, or tolerate the degraded operation of digital data communication traffic.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a data communications apparatus and method, that allows a user to identify that parallel or concurrent operation of POTS and data communications equipment is either occurring or being attempted, and more particularly, indicates the impact to the operation of a multiple channel data communications device as a result of the parallel or concurrent operation with the POTS equipment, via a signal.

One embodiment of the modem apparatus and method for user warning signal during data transmission degradation includes apparatus for detecting that there is parallel or concurrent data communication and analog POTS traffic on a user premises line, the determination of which user site is causing the degradation by the direction of the data communications traffic being degraded, measuring the amount of data communications rate degradation and measuring time period of data communications degradation.

The modem apparatus used in this embodiment includes a memory containing a plurality of program routine sequences and a processor that performs the selected program routine sequences to detect data communications rate degradation, which user site is causing the degradation by the direction of the data communication traffic being degraded, the amount of degradation and the time period of the data communications data rate degradation. There is also a routine (not shown) that constantly monitors the data communications data rate during periods of data communication only. It is this figure that is used to determine the amount of degradation from optimal performance when data communications is occurring in parallel with analog POTS traffic.

An alternate embodiment provides for indicating to a user the special case of the data communications is being interrupted because of analog POTS traffic. This interruption causes a suspension in the data communication, and therefore, it is imperative that the user be warned, via a multivariable signal, that the data communications is suspended, which user site is causing the degradation by the direction of the data communications being suspended and the elapsed period of time of the suspension.

In another alternate embodiment, the processor measures the period of time of the data communications suspension or which user site is causing the degradation by the direction of the data communications traffic and then computes the multivariable warning signal for warning the user that data communications has been suspended.

BRIEF DESCRIPTION OF THE DRAWINGS

The accompanying drawings incorporated in and forming a part of the specification illustrate several aspects of the present invention, and together with the description, serve to explain the principles of the invention. In the drawings.

Figure 1:
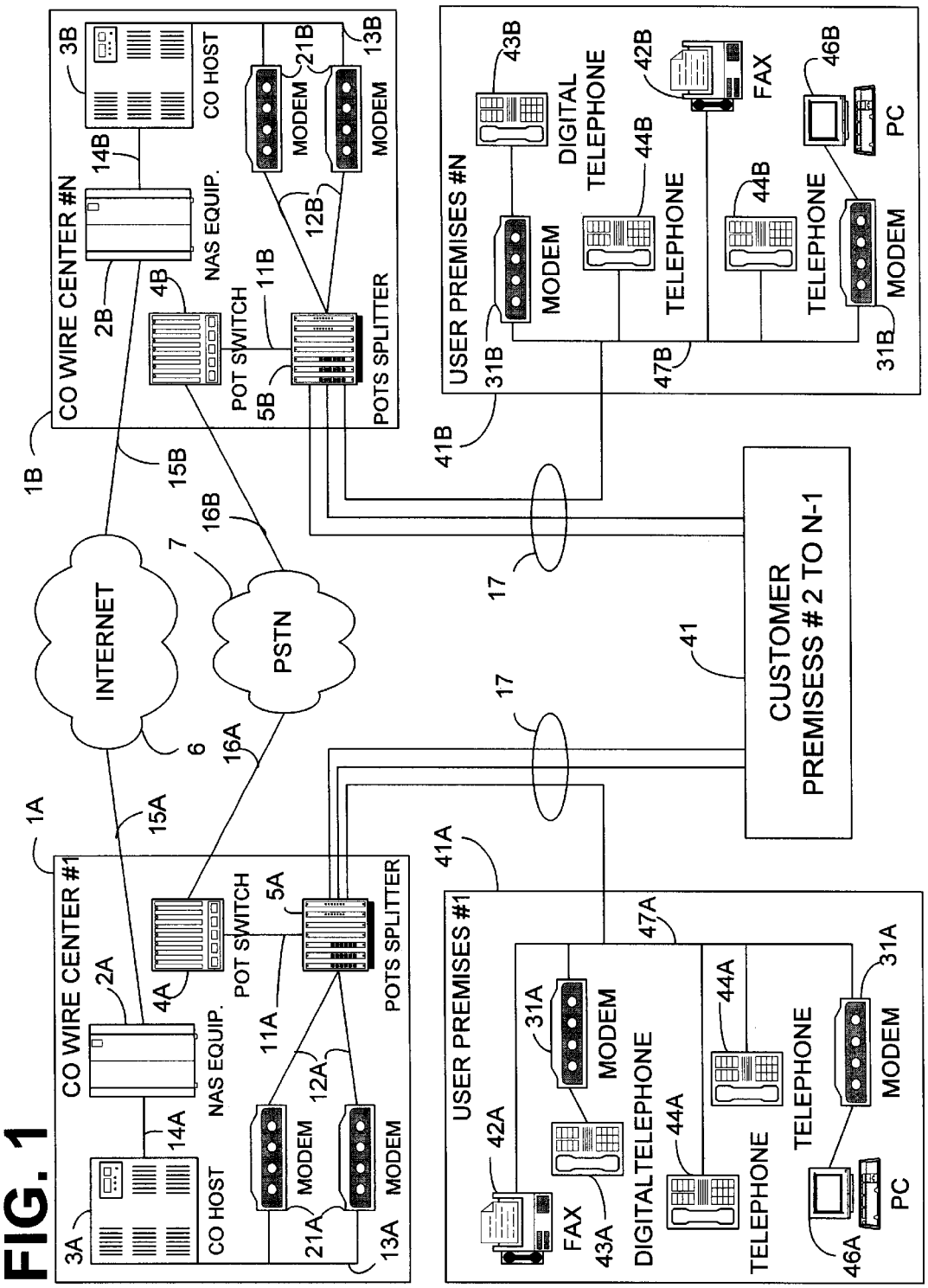
FIG. 1 is a view of the Central Office Wire Centers and User Premises layout of the present invention.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

DETAILED DESCRIPTION OF THE PREFERRED EMBODIMENT

Referring now in detail to the drawings in which the reference numerals indicate like parts throughout several views.

FIG. 1 illustrates the plain old telephone system (POTS) networks including data communication modems (21 and 31) of the preferred embodiment. The data communication modems include the apparatus and methods for generating user tone warning during data transmission suspension or degradation on premises lines 17.

The POTS network includes numerous user premises 41, wherein each user premises is connected to a central office wire center 1, via a subscriber line 17. Each subscriber line 17 is connected to a user premises line 47, for distribution of POTS service throughout the user premises. Usually, there are numerous POTS devices connected to each user premises line 47, such as telephones 44, fax machines 42, PC modems, and the like. It is also known, (but not shown), that it is possible to have multiple subscriber lines 17 connected to each user premises, thereby creating two separate user premises lines 47 within each user premises.

As noted previously, each user premises is connected, via a subscriber line 17, to a central office wire center 1. The subscriber line 17 is connected to a POTS splitter device 5 that separates the analog POTS signals from data signals. The plain old telephone system (POTS) signals are sent to a POTS switch 4 that is connected to the other central office wire centers, via the public switched telephone network (PSTN) 7. Digital data signals separated from the POTS analog signals at POTS splitter 5, are connected to modems 21 within the central office wire center. Note that the POTS splitter is not necessary to utilize the present invention, and it may be omitted in some applications. Modems 21 are further connected to a central office host 3 for processing and transmission of data signals to network equipment 2, for connection with digital data networks such as the Internet 6.

Since the above is a description of the present invention's applied system environment, a brief discussion of an example of the signals generated in the user premises and transmitted through the central office wire center, via either the PSTN or Internet networks and back to a user premises will now be detailed.

When a user wishes to place a telephone call on device 44, the user picks up the receiver and puts the subscriber line 17 in an off-hook condition that is detected at the central office wire center 1, by closed switch hooks (not shown). The off-hook condition signals the central office wire center 1, via subscriber line 17, to accept an outgoing call by allowing a flow of D.C. current and an audible dial tone to be sent to device 44. The outgoing telephone call signals are transmitted, as described before, via subscriber line 17 to POTS splitter 5. The analog POTS system signals are separated from the digital signals, and the POTS signals are directed towards the POTS switch 4 for transmission, via the PSTN network 7, to the destination central office wire center of the destination user premises. The signal from a source central office wire system transmitted through the PSTN network 7 is directed towards the POTS switch 4 in the destination central office wire center. The signal is further directed towards a POTS splitter 5 within the destination central office wire center 1. The signal is transmitted, via subscriber line 17, to the destination user premises. The signal enters the destination user premises, via subscriber line 17, and is connected to the user premises line 47 that distributes the signal to be received throughout the destination user premises. This is the path in which a plain old telephone system (POTS) call is transmitted.

Now, a description of digital signals to/from the user premises will be described. When a user desires to transmit data over a digital network via his personal PC, digital phone, digital fax, or the like, the digital signals from the digital device, are transformed into analog signals, via multiplexing by modem 31. The signals are transmitted over the user premises line 47 to the subscriber line 17 for final delivery to the local central office wire center 1. The digitally multiplexed analog signals going into POTS splitter 5, are separated from the analog POTS signals, and are directed to modems 21. Modems 21 demultiplex the analog signals back to their original digital data signals. The modems 21 transmit the digital data signals to the central office host 3 for processing and transmission of the data signals to network equipment 2, for further transmission of the data signals over the Internet 6. The digital data signals sent via the Internet 6 are received at the destination central office wire center 1 by the network access service equipment 2. The signals are transmitted to the central office host 3, for processing and transmission to the modems 21. The modems 21 multiplex the digital signals into analog signals for transmission through the POTS splitter 5 and over destination subscriber line 17 to the destination user premises 41. The multiplex signals are received at the user premises line 47, for distribution to all equipment connected to the user premises distribution line. The multiplex signals are demultiplexed, within the destination modem 31, back to a digital signals, which are transmitted to the digital device connected to the modem.

Since the parallel operation of digital data communications and POTS traffic on subscriber line 17 impacts the overall data communications data rate, due to sharing bandwidth, it is of value to notify the user when digital data communications and POTS traffic is occurring and affects the overall data rate of the data communications device. This is particularly important in the second embodiment, where the data communications is suspended whenever POTS devices are used on the same subscriber line. It is critical to notify the user that data communications has been suspended, the length of the suspension and which user site is causing the degradation by the direction of the data transmission suspension to prevent the data transmitting equipment from timing out.

The first embodiment of the modem apparatus and method for warning a user of degraded service provides for user notification that data communications and analog traffic is occurring in parallel, which user site is causing the degradation by the direction of the data communications being degraded, the time period of the degradation and the amount of degradation occurring. The modem apparatus and method includes apparatus and steps for determining which user site is causing the degradation by the direction of data traffic, the time period of parallel data communications and POTS traffic, and the amount of data communications degradation.

The modem apparatus used in this embodiment includes a memory containing a plurality of program routine sequences, and a processor that performs these sequences when data communications occurs in parallel with analog POTS traffic. The processor analyzes the above data, determines which user site is causing the degradation by the direction data communications impacted, the amount of degradation, the time period of the degradation and then generates a multiple variable warning signal to the user to notify the user that data communications transmissions is occurring in parallel with degraded performance.

Figure 2A:
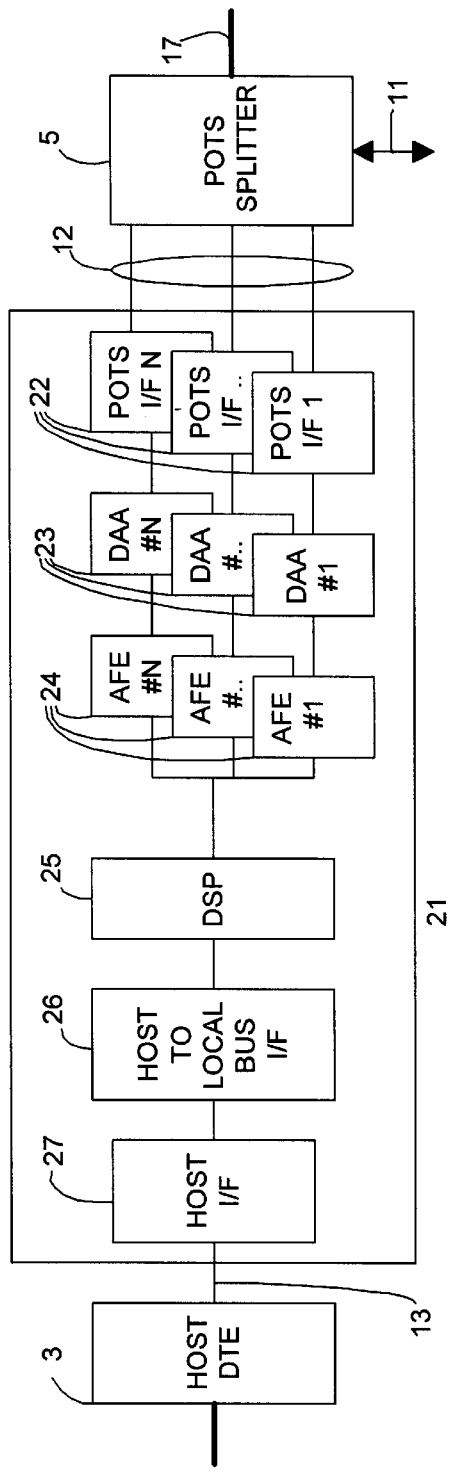
FIG. 2A is a block diagram of the Central Office POTS interface and modem apparatuses of FIG. 1.

FIG. 2A is a block diagram of the CO wire center multichannel data communications device modem (modem 21) constructed in accordance with the present invention. The typical configuration of the central wire office 1 multichannel data communication device is connected, via a POTS splitter 5, to the subscriber line 17. The analog signals output from POTS splitter 5 into the central office multichannel data communications device 21, are connected through communication links 12 into the POTS interface 22. The central office multichannel data communications device 21 provides for multiple analog lines 12 to be input and converted to digital signals, due to the efficiency of the processor 25 within the central office multichannel data communication device 21. Because multiple analog input lines are permitted, device 21 may require multiples of the analog POTS interface hardware 22, dial access arrangement (DAA) logic 23 and analog front end (AFE) logic 24.

The analog POTS interface hardware 22 connects analog signal line 12 to the dial access arrangement (DAA) logic 23.

The dial access arrangement (DAA) logic 23 provides surge protection and impedance matching, and will be explained in detail hereinafter with reference to FIG. 4. The dial access arrangement (DAA) logic 23 connects the analog signals to the analog front end (AFE) logic 24.

The analog front end (AFE) logic 24 converts the analog signal to a digital data signal. The AFE will be explained in detail hereinafter with reference to FIG. 5. The AFE logic 24 transmits the digital signal to the DSP logic 25 for reconstruction of the digital data. Multiple analog front ends logic 24 may be connected to a single DSP, CPU, ASIC or other processor logic 25, due to the high processing speed of such processor logic.

In alternative embodiments of the invention, the multiple dial access arrangements (DAA) logic 23 and analog front ends logic 24 are not necessary to practice the present invention, and it may be omitted in some applications where the dial access arrangement (DAA) logic 23 and analog front end logic 24 are shared between numerous analog POTS interface hardware 22.

DSP logic 25 reconstructs the digital signal streams into usable digital data by stripping error control information, data compression and the like added by the far-end modem. The reconstructed digital data is transmitted from the DSP logic 25 to the host local bus interface 26. DSP logic 25 will be explained in detail hereinafter with reference to FIG. 7.

The host local bus interface 26 takes the digital data from the DSP logic 25, adds the necessary control characters and interrupts for transmission of the digital data through host communication interface 27, to the host DTE 3. Host local bus interface 26 will be further described in FIG. 6.

Figure 2B:
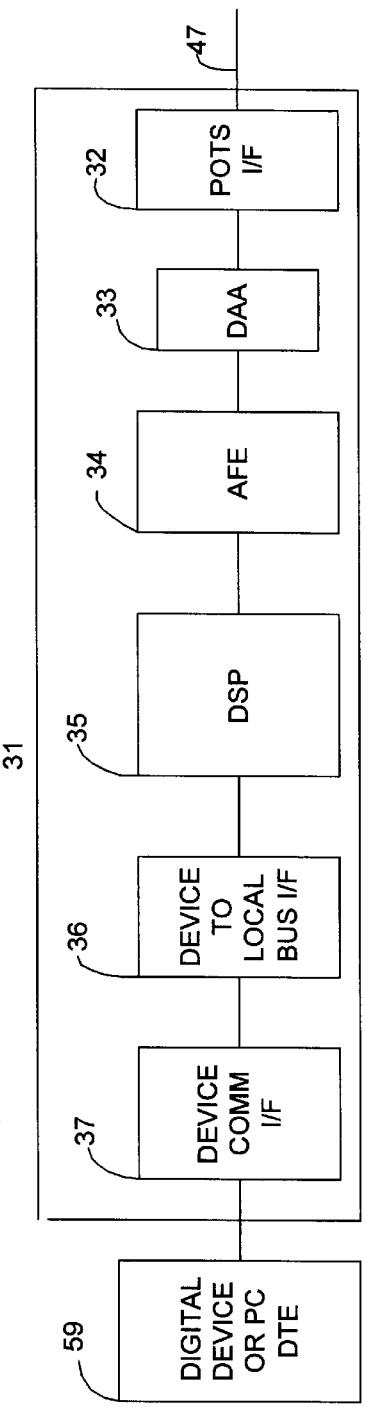
FIG. 2B is a block diagram of the User premises POTS interface and modem apparatuses of FIG. 1.

FIG. 2B is a block diagram of the single POTS line multichannel data communication device (modem 31) constructed in accordance with the present invention. The multichannel data communication device (modem 31), is substantially similar to the CO wire center multichannel data communication device 21, defined in FIG. 2A., except that device 31 is configured to accept only one POTS line connection. In the typical configuration, the user premises line 47 is connected to line jack POTS interface 32. The line jack POTS interface 32 is connected to Dial Access Arrangement interface 33, Analog Front End 34, digital signal processor logic 35, the device local bus interface 36 and the device communications interface 37, as described in 2A above as item 2X. The digital signal processor logic 35 is connected to the host to local IF bus via line 87, through the data terminal equipment (DTE) interface 27, which connects to a device such as a fax, digital phone, personal computer (PC), or the like.

Figure 3:
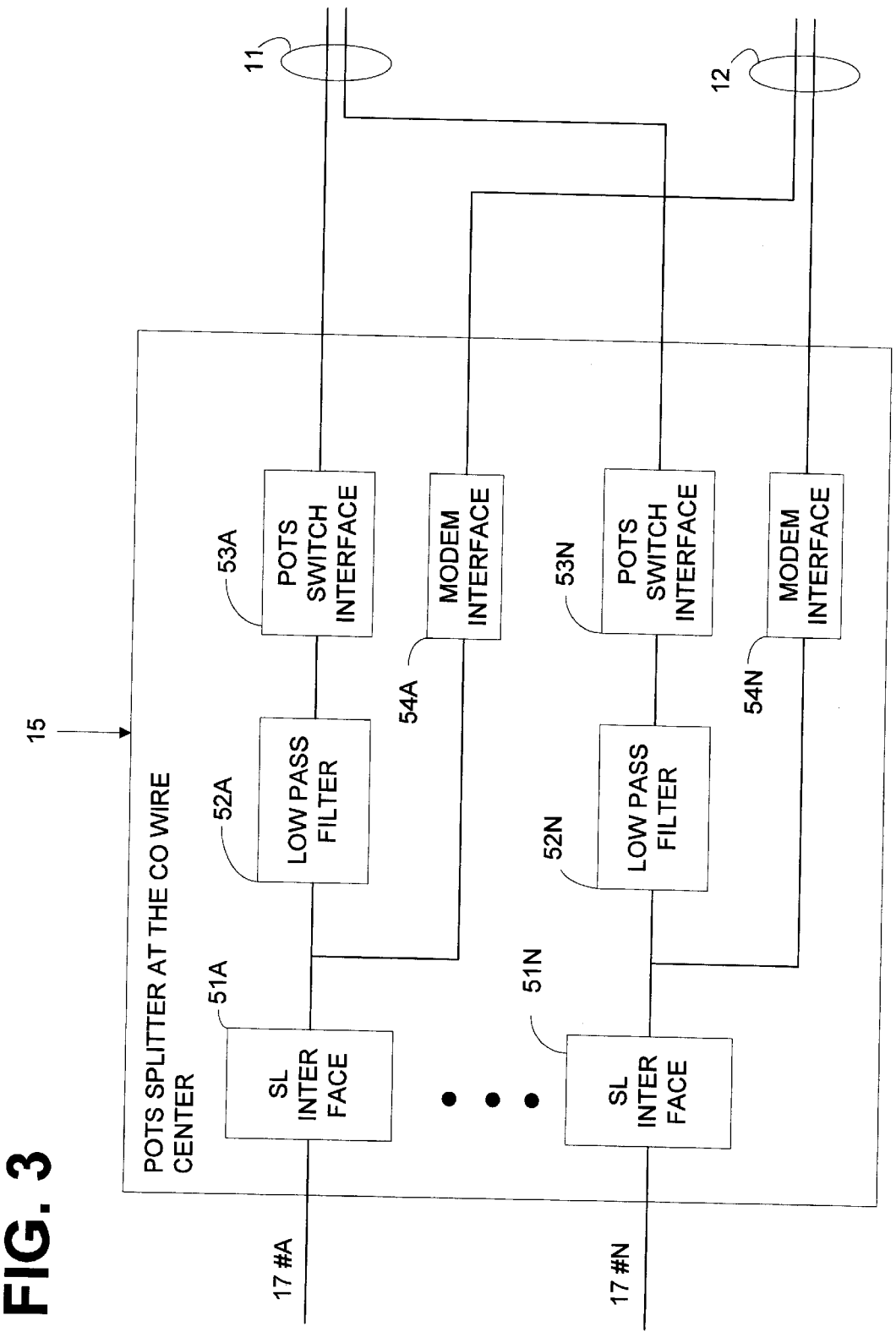
FIG. 3 is a block diagram of the Central Office POTS and Digital signals splitter of FIG. 1.

Referring to FIG. 3, which is a block diagram of the POTS splitter 5 at the central office wire center 1. The POTS splitter has numerous subscriber line interfaces 51(1)51 (N) that are connected to subscriber lines 17(I)–17(N). The POTS splitter 5 accepts analog signals across subscriber line 17(I)–17(N), conducts the analog signal through low pass filter 52 for transmission to the POTS switch interface 53. The POTS switch then transmits analog signals across communication link 11. The analog signals received from subscriber line interface 51 are also transmitted through modem interface 54, which transmits the data communication traffic to modem 31, via communication link 12.

Figure 4:
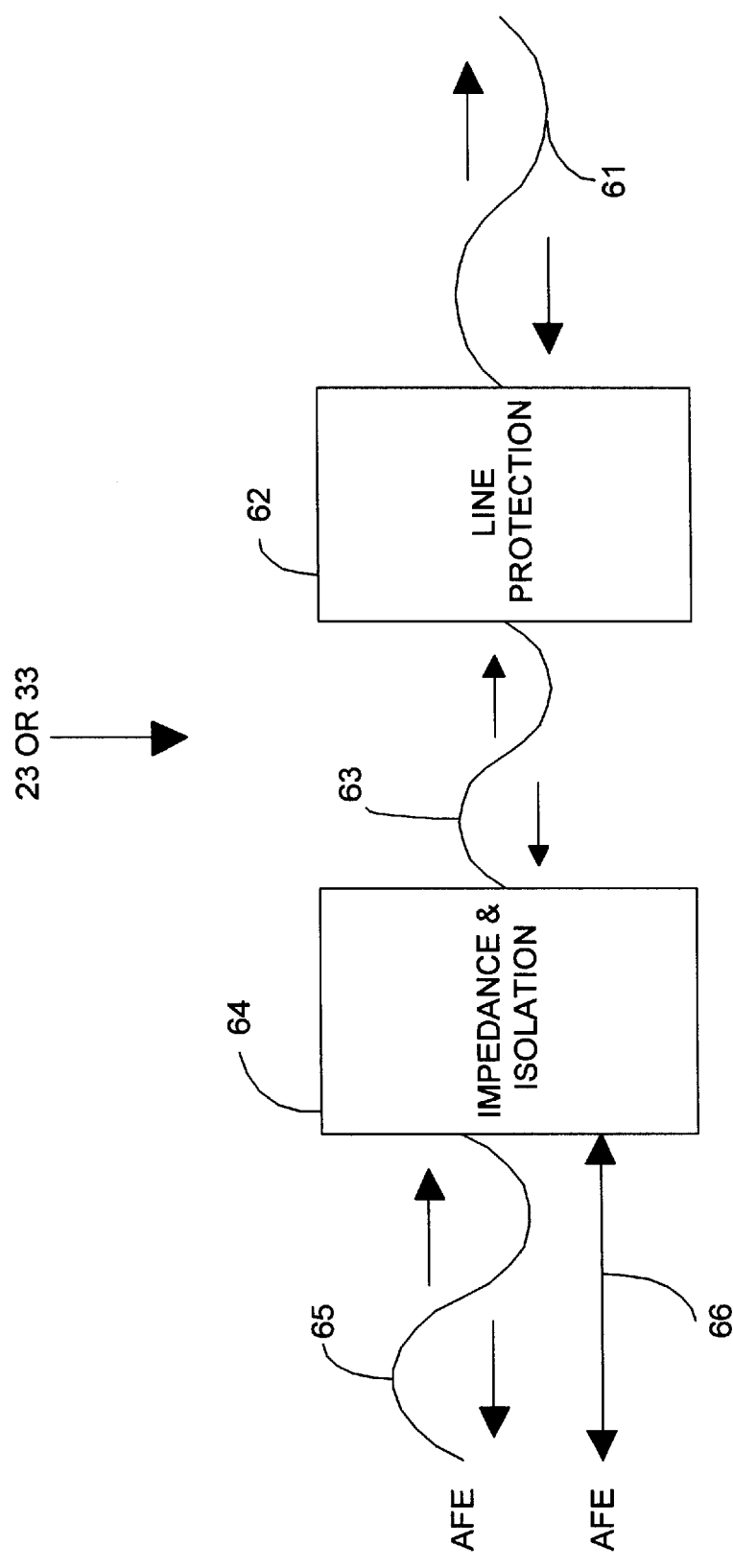
FIG. 4 is a block diagram of the dial access arrangement of the POTS interface and modern apparatuses of FIGS. 2 (A&B).

Referring to FIG. 4, which is a block diagram of the DAA (23 and 33, hereafter referred to as 23), the DAA 23 has an input/output analog communication port for bi-directional communications link 61. Analog communication link 61, connected to link 12, is connected to a line protection circuit 62.

Line protection circuit 62 protects the multichannel communications device against line surges, lightning strikes, and the like. Line protection circuit 62 is then further connected to the impedance and isolation circuit 64, via communication link 63. The Impedance and Isolation circuit 64 also contains circuitry (not shown) to Detect Ring Indicator on Off-hook conditions.

The impedance and isolation circuit 64 is comprised of an impedance matching circuit (not shown) before being connected to the two-to-four wire hyped interface (not shown). The DAA 23 is connected, via communication link 65, to AFE 24.

Figure 5:
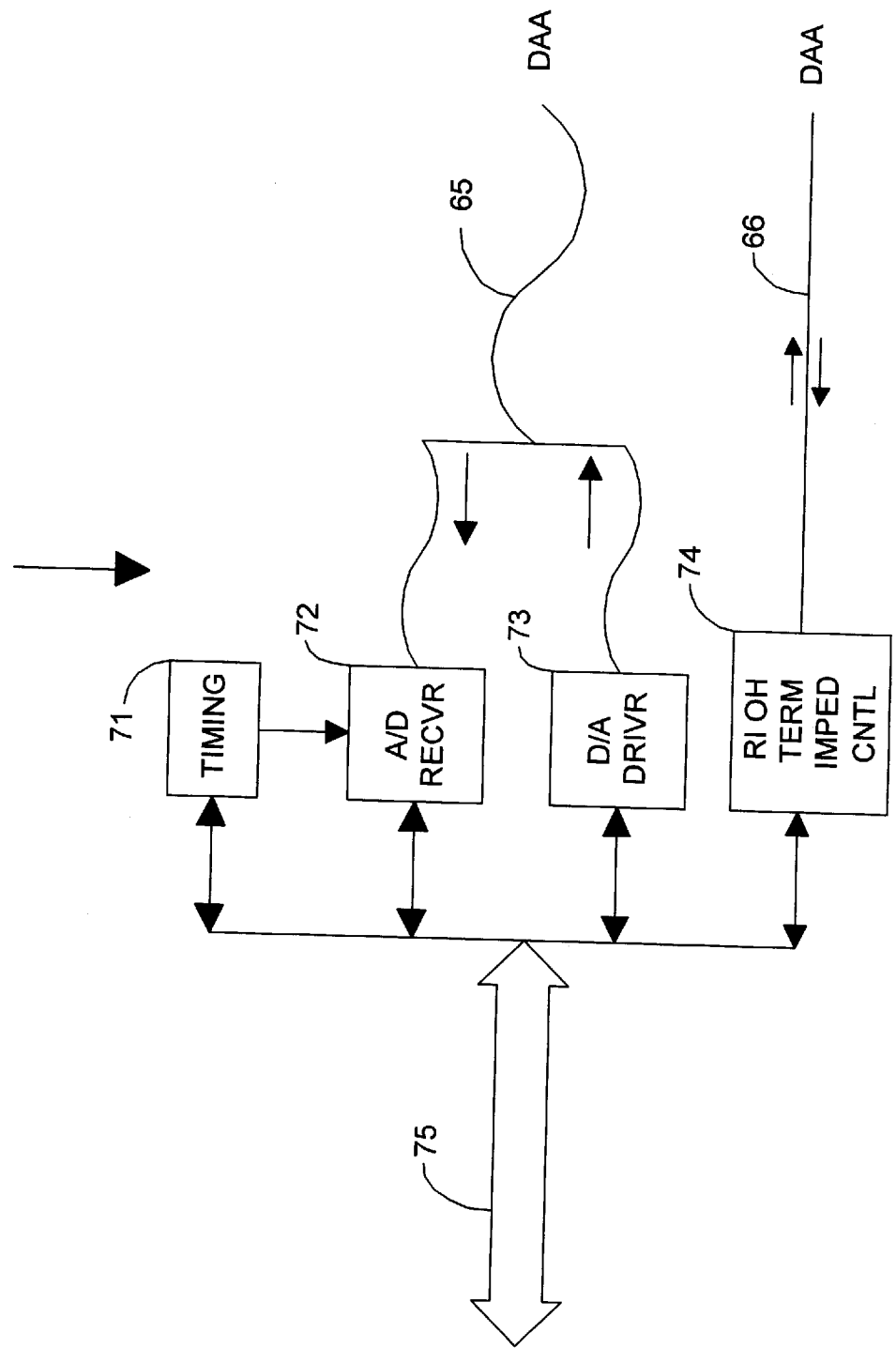
FIG. 5 is a block diagram of the analog front end of FIGS. 2 (A&B).

With reference the FIG. 5, the AFE (24 and 34, hereafter referred to as 24) is connected to communication link 65 which is connected to receiver 72. Receiver 72 receives the analog signals and converts the analog signal by using an analog-to-digital converter. Driver 73 drives the signals across communication link 65 to the impedance and isolation circuit 64 of DAA 23 (FIG. 4), after receiving signals from the driver's digital-to-analog converter. Receiver analog-to-digital converter 72 and driver digital-to-analog converter 73 are both connected to the bi-directional digital communication link 75. Ring indicator and off-hook conditions are processed in Ring Indicator (RI) Off-Hook (OH) Impedance Controller 74.

Figure 6:
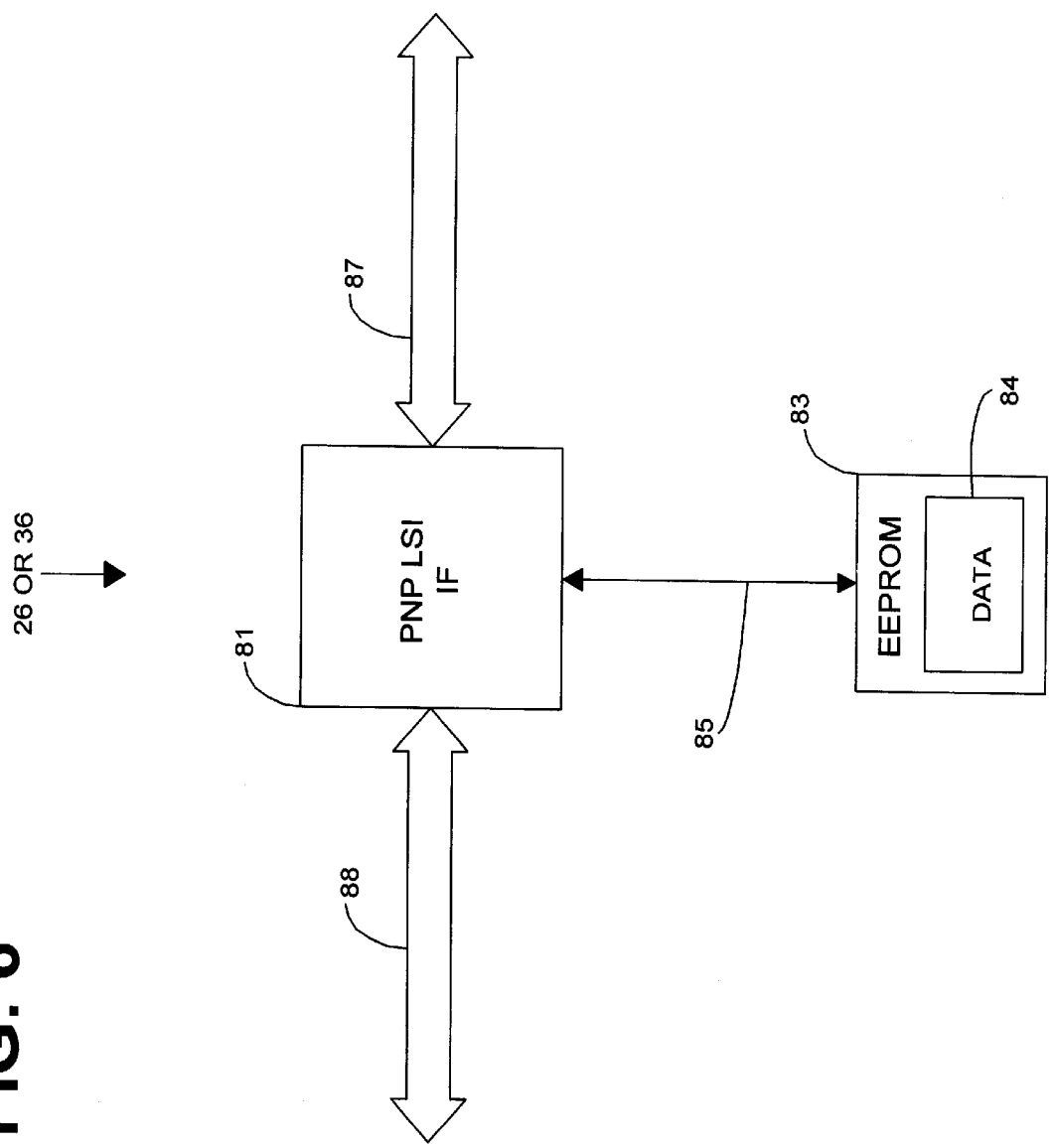
FIG. 6 is a block diagram of the plug and play interface between the DSP and the DTE devices of FIGS. 2 (A&B).

As shown in FIG. 6, plug and play interface logic (26 and 36, hereafter referred to as 26) is connected to digital signal processor logic 25, via communication link 87. The plug and play interface 26 includes a plug and play processor logic 81, which is connected to a static program memory, such as an EEPROM 83. EEPROM 83 comprises of matrix data 84, which includes data required for determining DTE or host Input/Output ranges, interrupt ranges, and the like. This data may be reprogrammed at any time by downloading data, via communication link 88, from the host or DTE. The PNP interface logic 26 is connected to the digital signal processor logic 25, via link 87.

Figure 7:
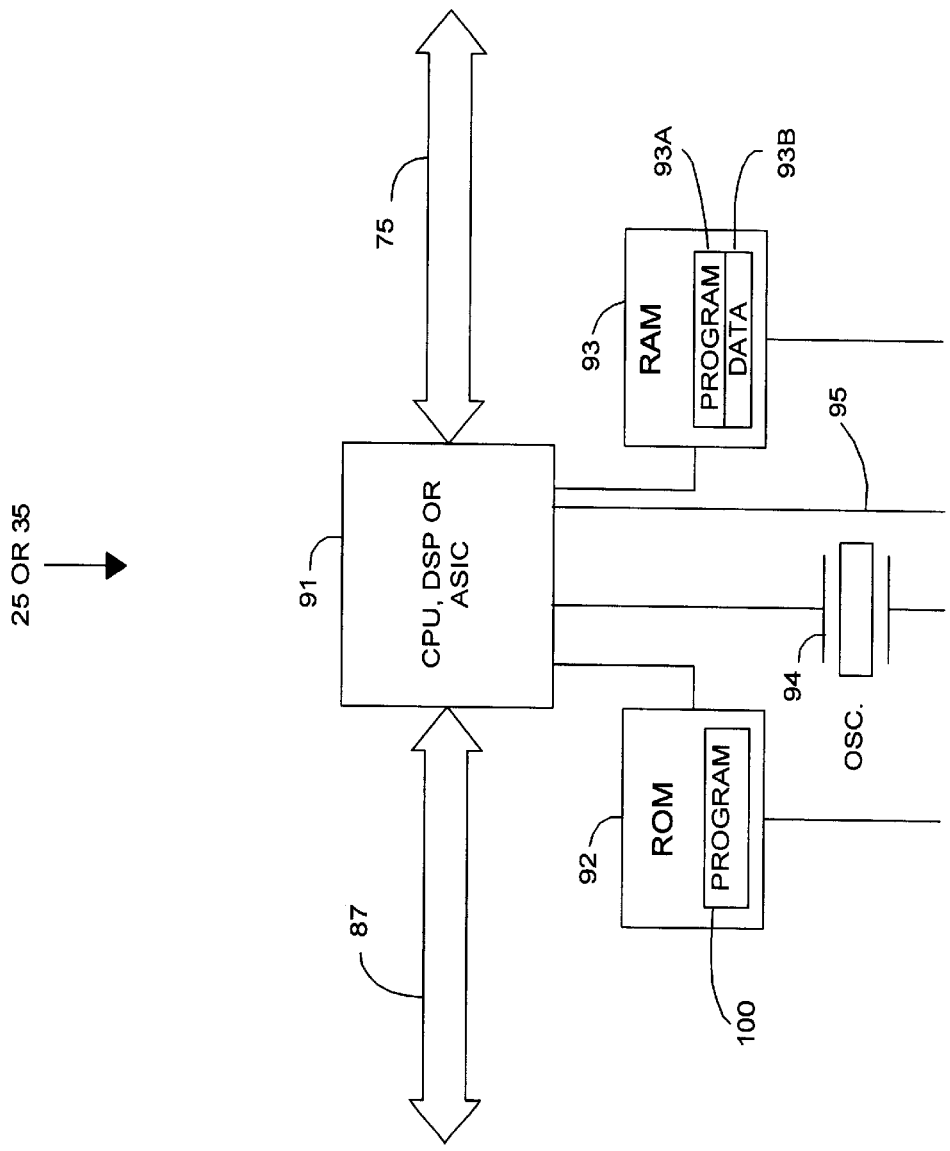
FIG. 7 is a block diagram of the digital signal processor engine and controller of FIGS. 2 (A&B).

As shown in FIG. 7, the digital communication link 75 is connected to the digital signal processor logic (25 and 35, hereafter referred to as 25), which includes a Digital Signal Processor (DSP), central processor unit (CPU), Application Specific Integrated Circuit (ASIC) chip 91, or other processor logic, which is connected to Read Only Memory (ROM) 92 and Random Access Memory (RAM) 93. ROM 92 can be comprised of either regular ROM or RAM memory, flash memories, Erasable Programmable Read Only Memory (EPROMs), Electrically Erasable Programmable Read Only Memory (EEPROMs), or other suitable program storage memories. RAM memory 93 can be comprised of static or dynamic RAM, EEPROM, or other suitable data storage memories.

In the first embodiment, the operation routines 100 are in the digital signal processor logic 25 program ROM 92, or in the program RAM 93A. Operation routines can be downloaded from digital devices, usually a PC connected to the host DTE interface 27, into the digital signal processor engine 25 program RAM 93A. It is in this way that an updated operation routine may be downloaded to the modem apparatus to update the operation of the apparatus.

Oscillator 94 provides timing signals for the DSP, CPU or ASIC 91. The DSP, CPU or ASIC 410 chip acquires power across line 95.

Digital communication links 75 and 87 can be comprised of 8, 16, 32, 64, 128 or other bit sized digital parallel communication links. Communication links 75 or 87 can also be comprised of bit serial or other types of chip-to-chip signal communication links.

Figure 8:
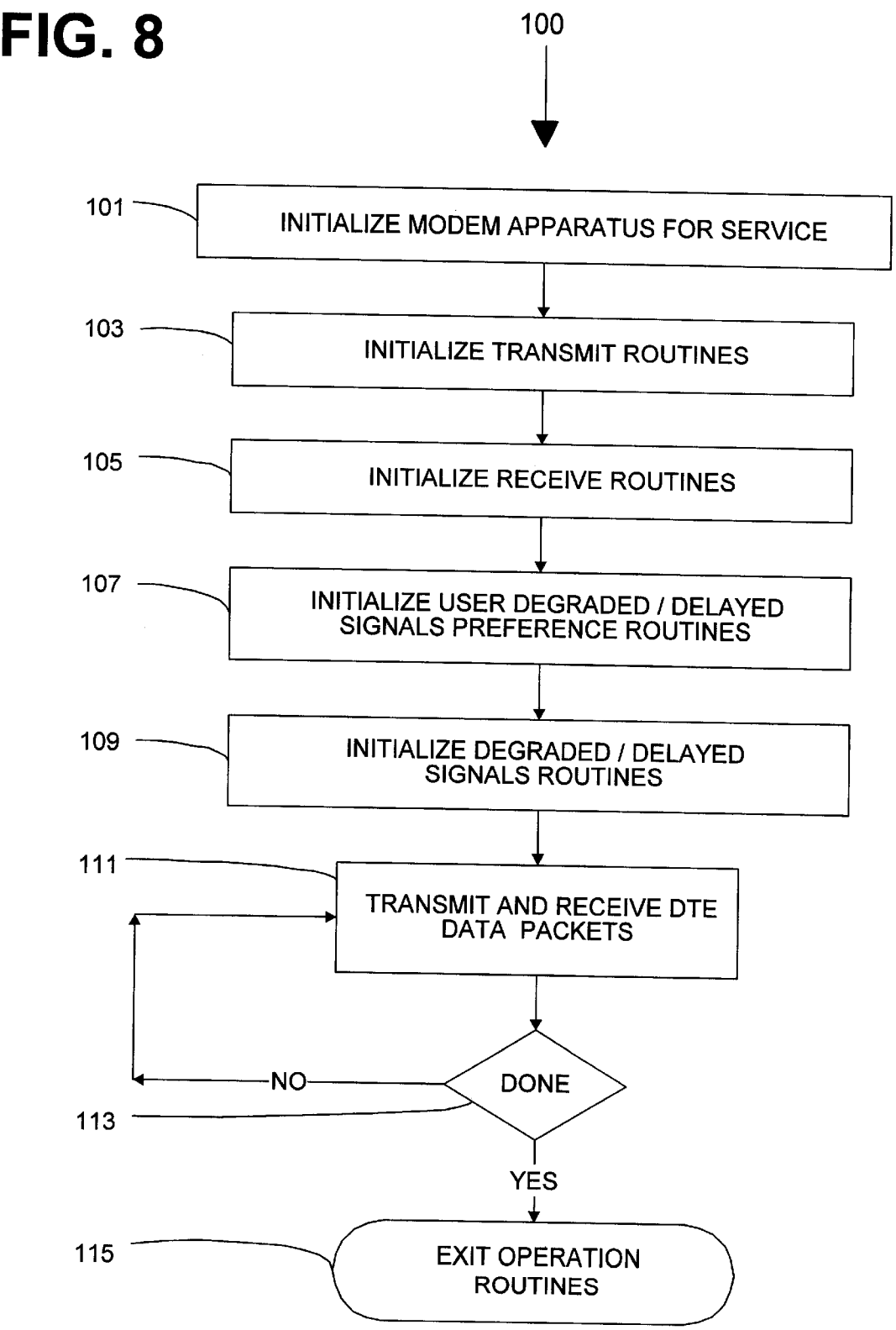
FIG. 8 is a flow chart of the process for the initializing the operation of degraded or delayed service routines residing in the DSP, CPU or ASIC device of FIG. 7.

Referring to FIG. 8, illustrated is a flow chart for the initializing the operation of degraded or delayed service routines loading into the DSP, CPU or ASIC device of FIG. 7, from memory program areas 93A or 100.

First, the operation routine is initialized within the DSP, CPU or ASIC logic 25 in step 101. These operation routines can be downloaded from a variety of different sources. In one embodiment, the operation routines are in digital signal processor logic 25 program ROM 92 program area 100. These operation routines can also be downloaded from other data devices. These devices are usually a PC connected to an interface 37, as illustrated in FIG. 2B, and download the routines into the digital signal processor logic 25 program RAM area 93A. It is in this way that an updated operation routine may be downloaded into the data communications equipment to change the operation of the modem device.

Figure 9:
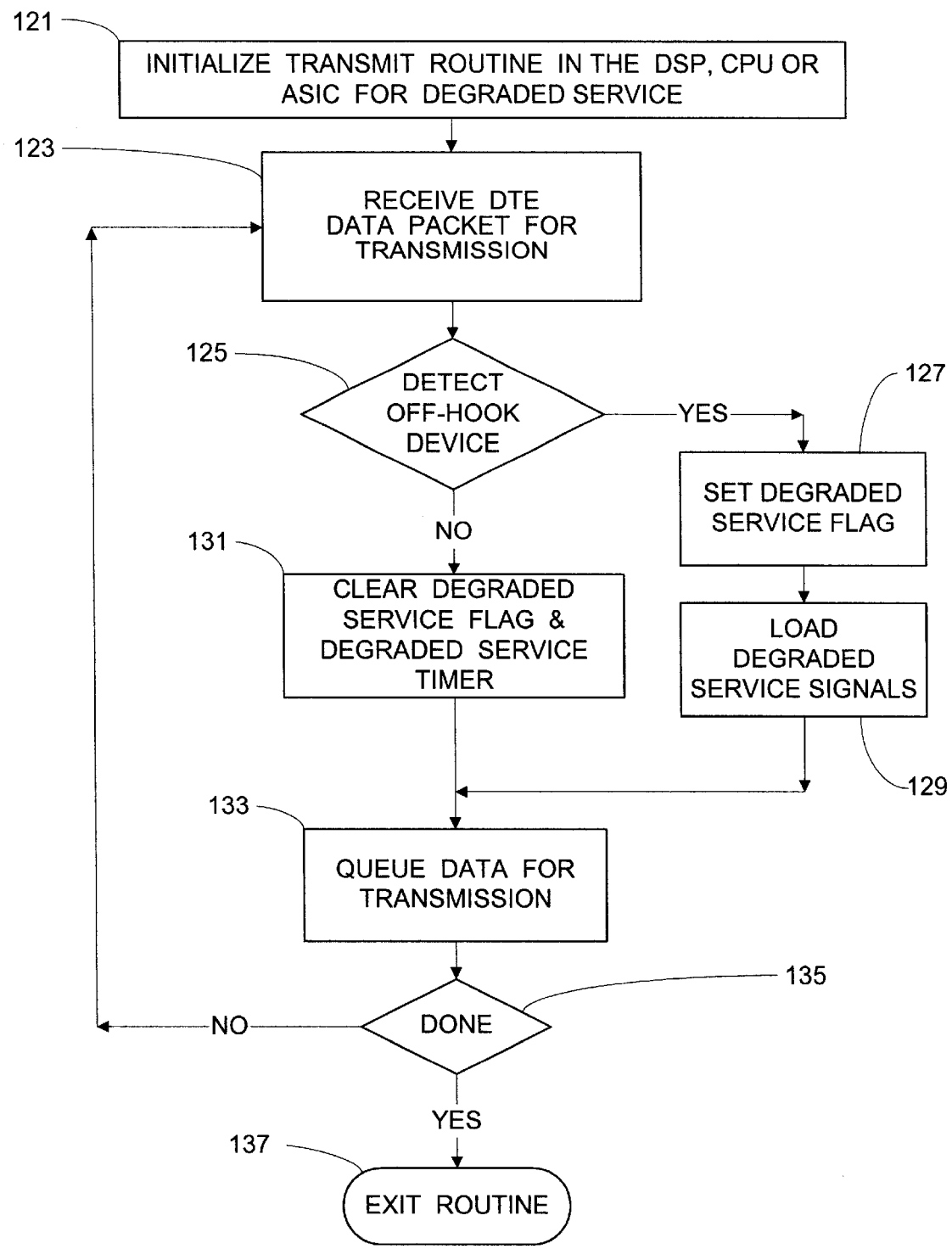
FIG. 9 is a flow chart of the process for the degraded service transmit routine residing in the DSP, CPU or ASIC data communications device of FIG. 7.

The operation routines downloaded into DSP logic 25 include the general initialization of the transmit operation routine (step 103) further explained in reference to FIG. 9, and initialization of the receive operation routines (step 105). Initialization of the modem apparatus further continues, by initializing the user degraded and delayed signals preferences routine (step 107). This routine will be further explained in reference to FIG. 12. The user preference degraded and delayed signals are the base signal that the user selects from a set of pre-selected signals. These signals indicate that suspended or degraded operation is occurring. Next is the initialization of the test routine for determining if degraded or suspended transmission of the data communications signal is occurring (step 109). Once all the operation routines are loaded into the DSP logic 25 and initialization steps have been performed, the modem apparatus then proceeds to normal operation in step 111.

Normal operation consists of transmitting and receiving data packets, via analog communication link. The modem apparatus operation continues until the test for done (step 113) is true, at which time the operation of the modem apparatus is terminated and the operation routines are exited in step 115.

Referring to FIG. 9, illustrated is the flow chart for the transmit routine in the DSP, CPU or ASIC, for the first embodiment a warning signal for notification of degraded service. Step 121 initializes the transmit routine in the DSP, CPU or ASIC for degraded service. Once the transmit routines are initialized within the processor logic, the modem apparatus proceeds to normal transmit operation in step 123. At step 123, the transmit routine continuously checks if data packets from the DTE/Host have been received for transmission. Once a data packet has been received for transmission (step 123), it is then determined if the modem apparatus will be transmitting data in parallel with POTS traffic at step 125. This determination is made by detecting if the line has an off-hook device, or if POTS traffic is detected. If data is to be transmitted in parallel with POTS traffic, the degraded service flag is set at step 127. The degraded service flag indicates that the modem apparatus is transmitting data in parallel with analog POTS traffic, and therefore, operating in a degraded service condition. The user preferred base degraded service signals are loaded into the processor logic 25 at step 129. After the preferred service signals are loaded, the packet data is queued for transmission (step 133). If it is determined in step 125 that POTS traffic is not being transmitted, the degraded service flag and the degraded service timer are both reset in step 131, and the data is queued for transmission (step 133). After the data packet is queued, it is then determined if the modem apparatus is done sending data packets in step 135. If there are more data packets to be transmitted, the process returns to step 123 to repeat the transmit routine. If it is determined that the modem apparatus is done sending the data packets, then the transmit routines exits at step 137.

Figure 10:
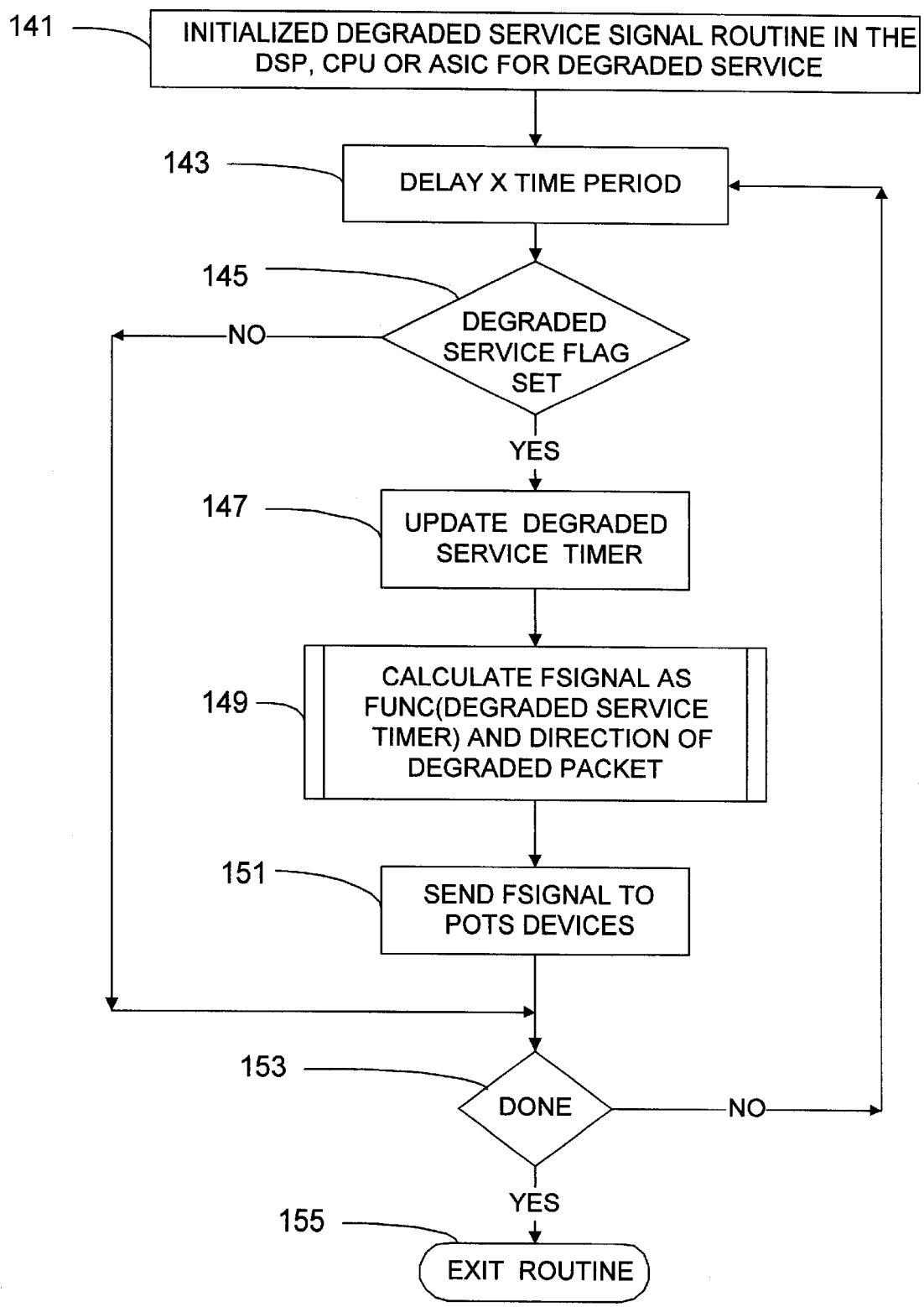
FIG. 10 is a flow chart of the process for the degraded service signal generation routine residing in the DSP, CPU or ASIC device of FIG. 7.

Referring to FIG. 10, illustrated is a flow chart of the routine that generates the degraded warning signal for the first embodiment. This routine operates concurrently with the transmit routine illustrated in FIG. 9. After initialization in step 141, a variable delayed period occurs at step 143. Next, it is determined if the degraded service flag is set in step 145. If the degraded service flag is set, the process moves to update the degraded service timer by incrementing the degraded service counter in step 147. The degraded service timer data is used in the calculation of the final warning signal, which is a function of the degraded service timer and the direction of the degraded data packet in step 149, and is further illustrated in FIG. 11. Once the final warning signal is computed, it is then transmitted on the communications line to both user premises at step 151. Next, it is determined if the modem apparatus is to continue in an operations mode at step 153. If operations are not done, the process returns to step 143 to repeat the process. If at step 145, it is determined that the degraded service flag is not set, the process jumps to step 153 to determine if operations are complete, as described above.

Figure 11:
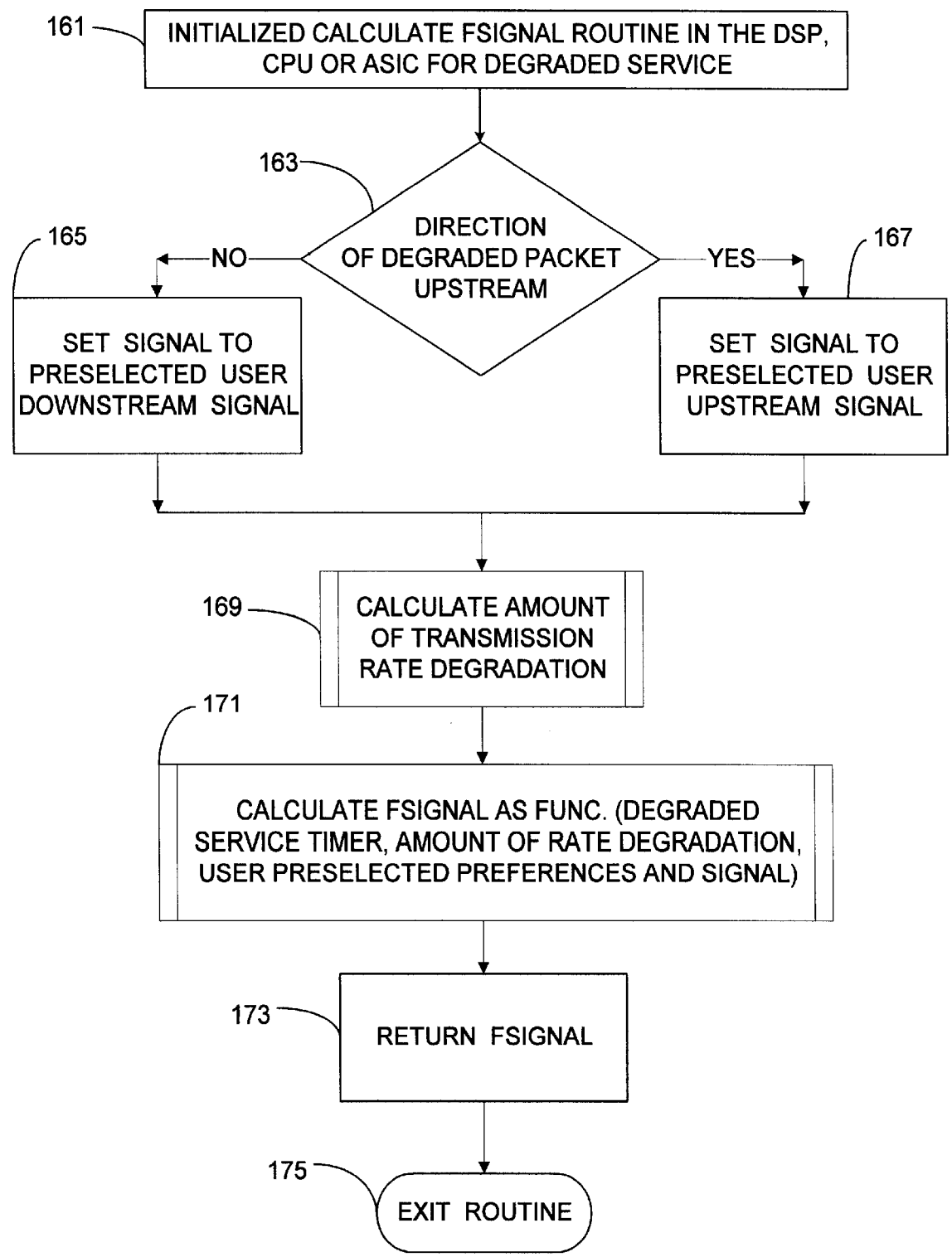
FIG. 11 is a flow chart of the process for calculating the final warning signal routine for degraded service, that residing in the DSP, CPU or ASIC device of FIG. 7.

Referring now to FIG. 11, illustrated is the flow chart for calculating the multiple variable warning signal routine as referenced at FIG. 10, at step 149. The multivariable signal routine referenced in step 149 is first initialized at step 161. Next, the direction of the degraded packet is determined by testing if the degraded data packet is being transmitted upstream from the user at step 163. If the direction of the degraded data packet is upstream, the signal is set to the user pre-selected upstream signal at step 167. If the direction of the degraded data packet is not upstream, and is in fact downstream to the user, the signal is set to the pre-selected downstream signal at step 165. Next, the amount of data degradation is calculated at step 169, which is to be further explained in FIG. 13. The final signal is determined as a function of the time period on the degraded service timer, the amount of data degradation computed in step 169 above, the user pre-selected base signal indicating direction of the data packet and the user pre-selected signals identifying the variation of the final signal at step 171. The final signal generated from this calculation at step 171, is returned as a final signal in step 173. The multivariable signal calculation routine is then exited at step 175.

Figure 12:
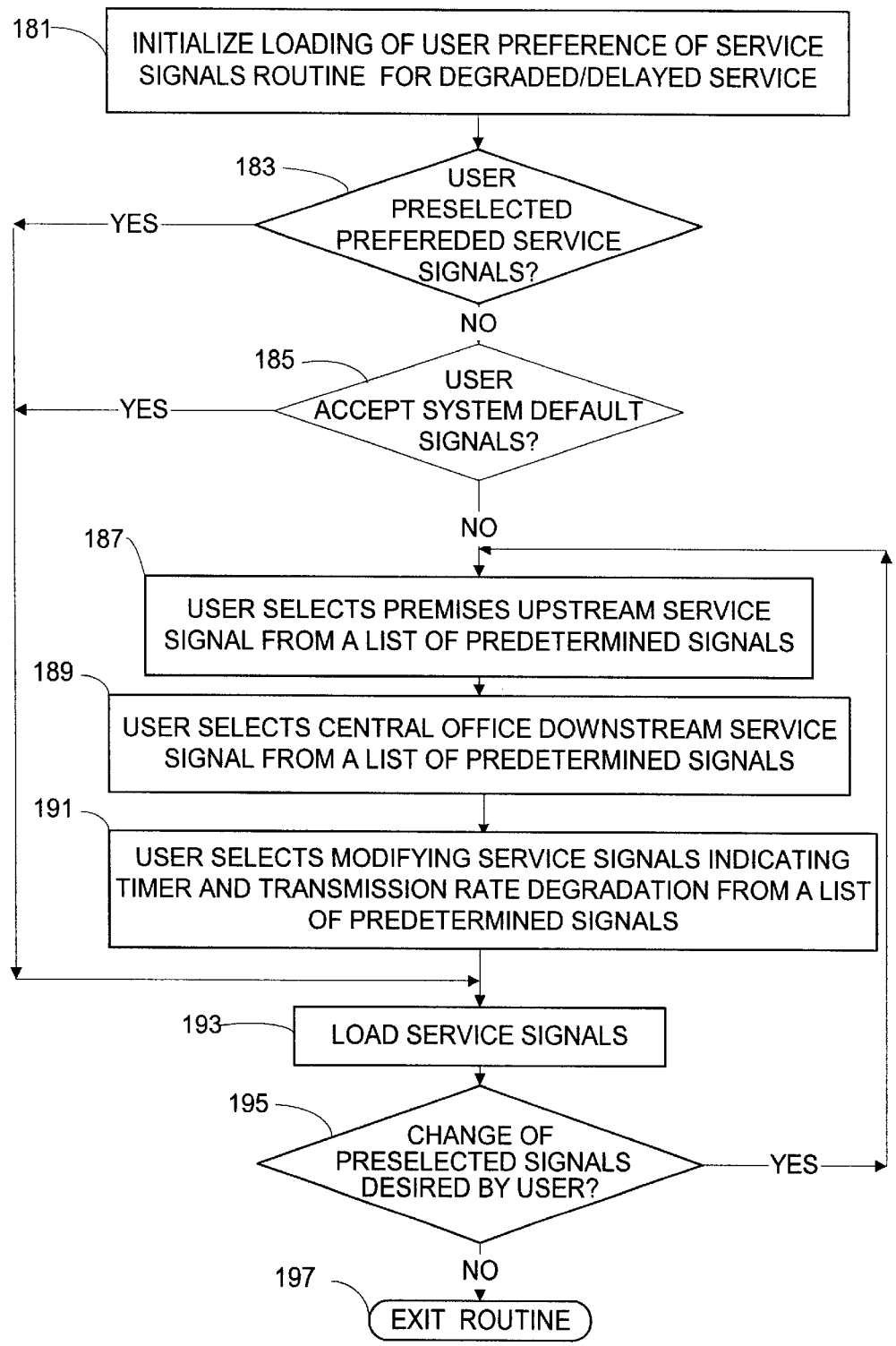
FIG. 12 is a flow chart further defining the loading of service signals process for utilization by the transmit routine of FIG. 9.

Referring now to FIG. 12, illustrated is the routine that loads the user preferred service warning signals for both degraded and delayed service referenced in step 107 of FIG. 8 and step 231 of FIG. 12, respectively. Initialization of the loading of the user preferred warning service signals routine is performed at step 181. It is determined if the user has pre-selected the preferred warning service signals at step 183. If the user has not pre-selected service signals, the process proceeds to step 185 to determine if the user accepts the system default warning signals. If the answer is no, then the user is prompted to select the premises upstream service signal from a list of predetermined signals at step 187. The user then selects the central office downstream warning service from a list of predetermined signals at step 189. Next, the user is prompted to select the signal modifications indicating the increasing time of the degradation or suspension and the modifying signal indicating the amount of transmission rate degradation. The warning service signals are then loaded at step 193. Next, it is determined if the user requests to change the pre-selected signals selected by the user at step 195. If the determination is yes, the user wishes to change the pre-selected signals, the process repeats steps 187 through 195. If the user does not wish to change the pre-selected signals, the user preference warning signal loading routine is then exited at step 197. Returning to steps 183 and 185, if it is determined that the user has pre-selected preferred service signals or that the user has accepted the system warning default signals, control of the process is forwarded to step 193 so those warning service signals may then be loaded.

Figure 13:
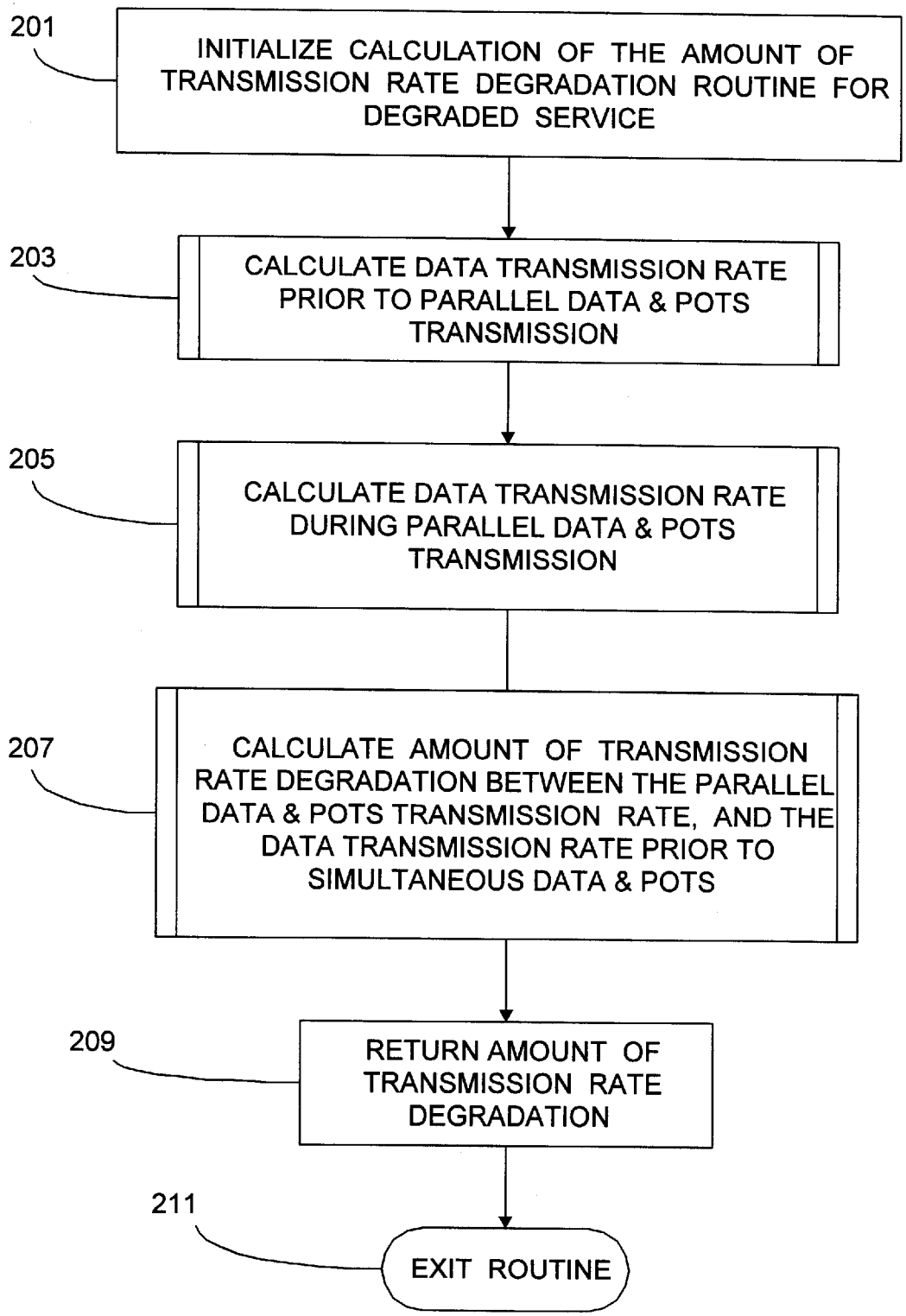
FIG. 13 is a flow chart of the process for calculating the amount of transmission rate degradation.

Referring to FIG. 13, illustrated is a flow chart for the routine that calculates the amount of transmission rate degradation referenced in step 169 in FIG. 11. Initialization of the calculation for the amount of transmission rate degradation routine occurs in step 201. This initialization step loads data transmission rate statistics kept for the modem apparatus with regard to the data transmission rate prior to parallel POTS and data transmission traffic. The calculation of the data transmission rate prior to the parallel POTS and data communication occurs in step 203, by averaging the ongoing measurements of the data transmission rate prior to the parallel POTS and data transmission. The calculation of the data transmission rate during parallel data and POTS communication occurs in step 205, by utilizing the average of the data rate during parallel transmission of data and POTS signals. The calculation of the amount of transmission rate degradation between parallel data/POTS transmission and the transmission rate of data communications only occurs in step 207 by dividing the transmission rate during parallel POTS/data transmission with the data transmission rate prior to parallel POTS data transmission. The factor calculated is returned to step 169 of the final signal generation routine illustrated in FIG. 11 at step 209. The data transmission rate degradation amount routine is then exited at step 211.

Figure 14:
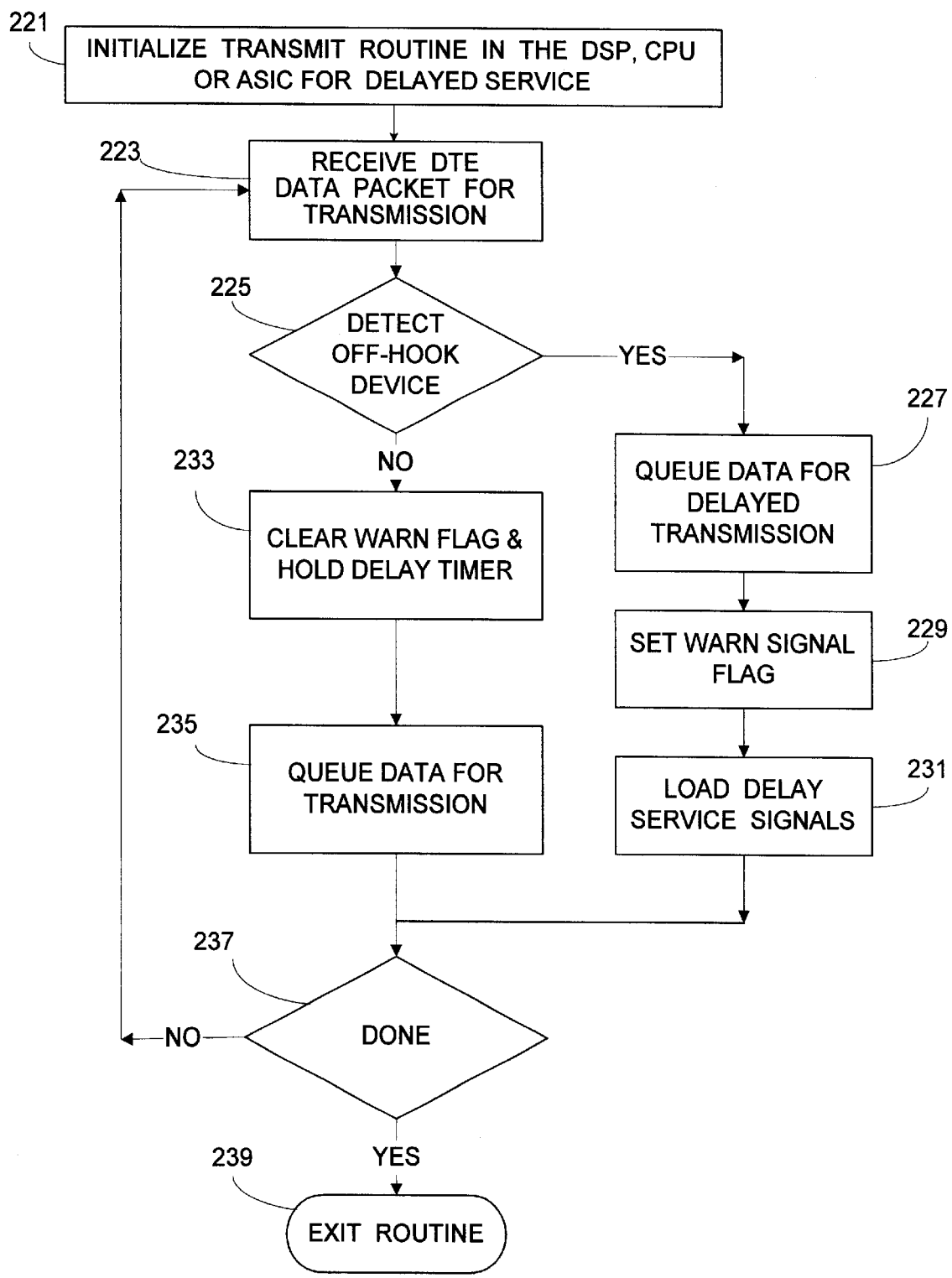
FIG. 14 is a flow chart of the process for the delayed service transmit routine residing in the DSP, CPU or ASIC data communications device of FIG. 7.

Referring to FIG. 14, illustrated is a flow chart for second embodiment that generates a multivariable warning signal to indicate to the user that data communications has been suspended in order to allow POTS traffic to occur. The initialization of the transmit routine for delayed service occurs in step 201. The modem apparatus waits to receive a data packet from the DTE or Host for transmission in normal operation at step 223. Once a data packet is received, it is determined if POTS communication is in progress by detecting if there is an off-hook signal in step 225. If in an off-hook condition, the data packet is queued for delayed transmission in step 227. Next, the warning signal flag is set in step 229, and warning delay service signals are loaded in step 231. Step 237 determines if there are more data packets to be transmitted. If the normal transmit operations are done, the transmit routine exits at step 239. If not done, the process returns to step 223 to receive additional data packets and the process is repeated. If at step 225, a data packet is received for transmission and there is no detection of an off-hook device, the warning flag and the hold delayed timer are cleared at step 233. Next, the data is queued for transmission, and the flow proceeds to step 237 to determine if normal transmission operations are done as described above.

Figure 15:
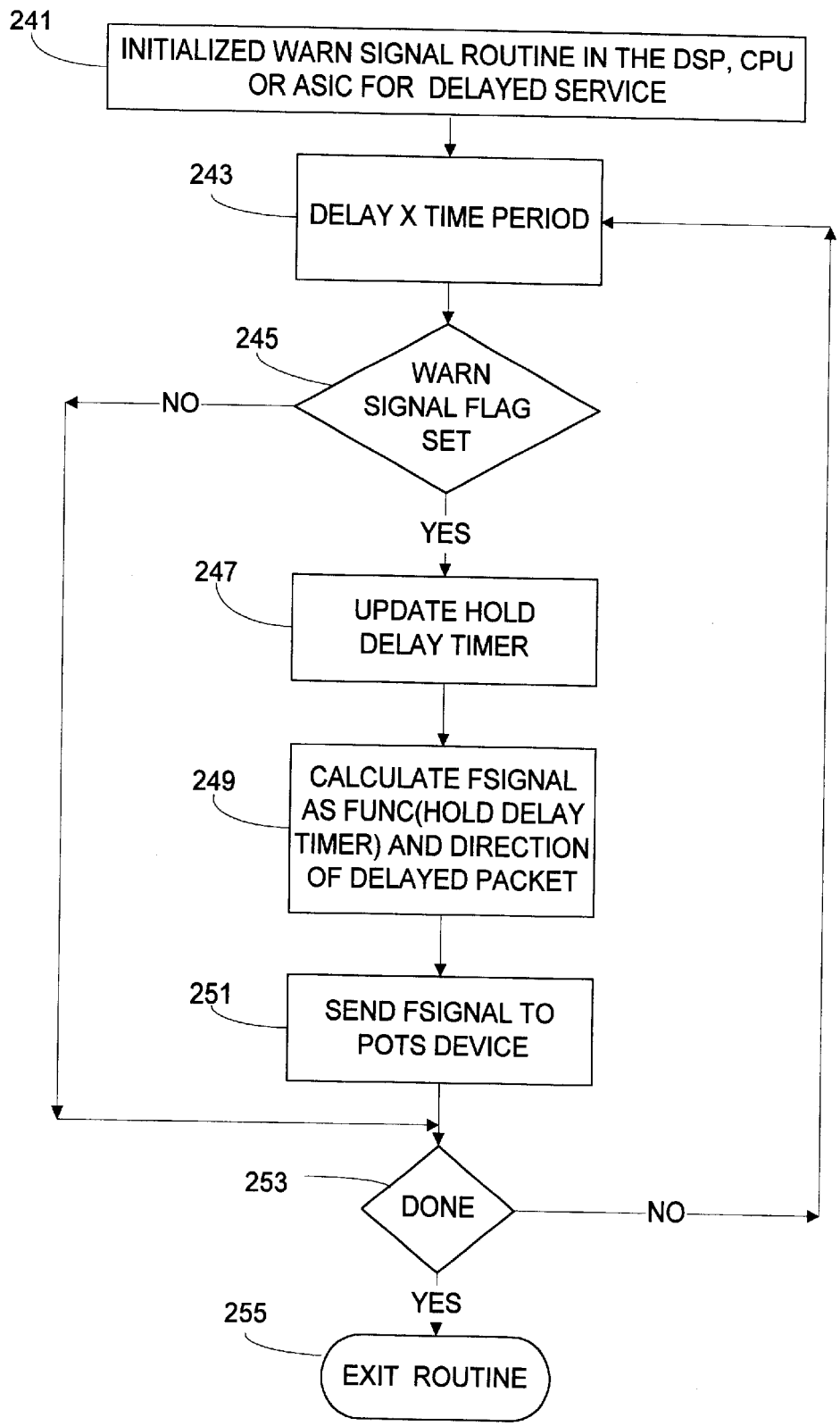
FIG. 15 is a flow chart of the process for the delayed service signal generation routine residing in the DSP, CPU or ASIC device of FIG. 7.

Referring to FIG. 15, illustrated is the flow chart for the routine generating the delayed data warning signal routine of the second embodiment. This routine operates concurrently with the transmit routine illustrated in FIG. 14. The delayed service warning signal generation routine is initialized at step 241. After initialization is complete, a delay timer is executed at step 243. After a predetermined delay time period, the warning signal flag is checked to determine if data communications is being attempted in parallel with POTS traffic at step 245. If the warning signal flag is set, then data communications is being attempted in parallel with analog traffic, and the hold delayed timer is updated at step 247. Calculation of the final warning signal is determined as a function of the hold delay timer, which is a time period the data communications is delayed, and the direction of the delayed data packet at step 249. This calculation calls the calculated final signal routine to be discussed in FIG. 16. The final warning signal generated is sent to both POTS devices across the analog communication line at step 251. Next, it is determined if continued operations is to occur. If continued operations is to occur, control repeats the process at step 243 by waiting a delayed time period. If normal operations is complete the routine exits at step 255. If at step 245 the warn signal flag is not set, the process jumps to step 253 to determine if continued operations is to occur, as described above.

Figure 16:
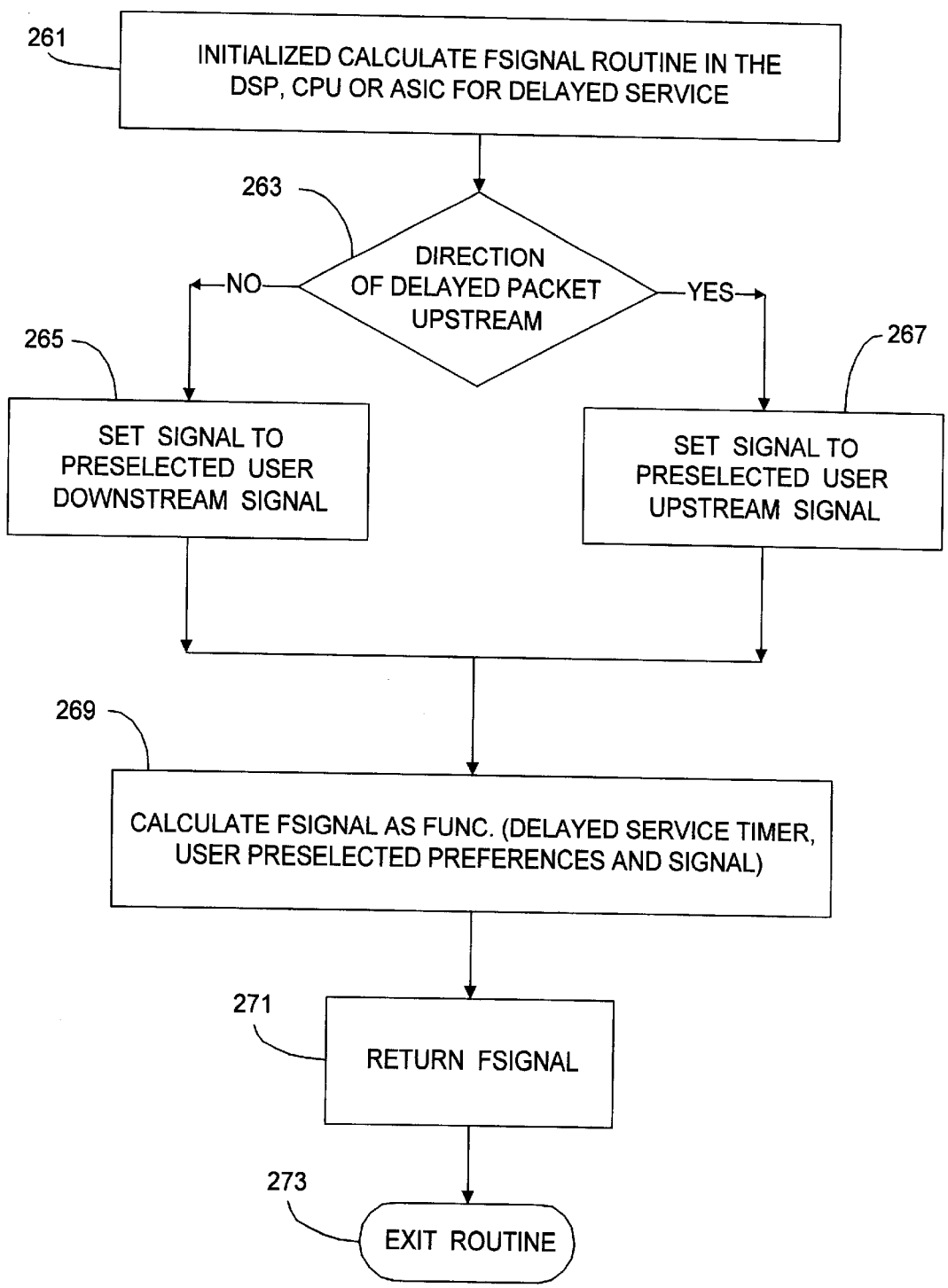
FIG. 16 is a flow chart of the process for calculating the final warning signal routine for delayed service, that residing in the DSP, CPU or ASIC device of FIG. 7.

Referring to FIG. 16, illustrated is a flow chart for calculating the final warning delayed service routine. First, the calculate final warning routine signal is initialized at step 261. Next, it is determined if the direction of the delayed data is upstream from the user at step 263. If the delayed data packet is upstream, the signal is set to the predetermined user upstream signal at step 267. If the direction of the delayed data packet is downstream to the user, the signal is set to the pre-selected user downstream signal at step 265. With the determination of which user site is causing the degradation by the direction of the delayed data packet, the signal indicating the direction of the delayed data packet is used in the calculation of the final delayed warning signal along with the time period in the delayed service timer, and the user pre-selected preference signals in step 269. The resulting final warning signal generated is returned at step 271 to the calculation of signal routine described in FIG. 15 at step 249. The calculated final delayed warning signal routine is exited in step 273.

A third embodiment has the calculate final delayed warning signal routine causes the calculation of the final delayed warning signal in step 269, to mute the final delayed warning signal calculated upon reaching a user set maximum delay time. This maximum delay time is set to value that corresponds to the timeout period of where the data session is dropped due to no data transmission.

As described above, routines 8–16 are executed by the DSP logic 25 and 35 of FIGS. 2A and 2B. However, a further alternative embodiment could have the routine executed in the CPU of a DTE or host device having the AFE (24 or 34), DAA (23 or 33), and POTS Interface (22 or 32) logic and hardware board.

Other embodiments have the warning signal indicate when the data transmission rate is impacted because of concurrent analog POTS and data communications transmission.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. Data communications apparatus comprising:

circuitry to identify transmission of a POTS signal on a communication link;

processor circuitry generating a warning signal to indicate when transmission of said POTS signal is degrading a data transmission rate of a data signal transmitted concurrently with said POTS signal on said communication link by said data communications apparatus; and circuitry calculating the elapsed time period of the degradation as a result of said transmission of said POTS signal degrading said data transmission rate by said data communications apparatus, wherein said processor circuitry modifies said warning signal as a function of the elapsed time period of the degradation.

2. The apparatus of claim 1, wherein said warning signal generated by said processor circuitry further indicates an amount of data transmission rate degradation as a result of said transmission of said POTS signal impacting said data signal transmission data fate by said data communications apparatus.

3. The apparatus of claim 1, wherein said warning signal generated by said processor circuitry further indicates a direction of the data communication traffic being degraded.

4. The apparatus of claim 1, wherein said warning signal generated by said processor circuitry designates a signal tone.

5. Data communications apparatus comprising:

circuitry to identify transmission of a POTS signal on a communication link;

processor circuitry generating a warning signal to indicate when transmission of said POTS signal is degrading a data transmission rate of a data signal transmitted concurrently with said POTS signal on said communication link by said data communications apparatus; and circuitry calculating the direction of the data communication traffic being degraded as a result of said transmission of said POTS signal degrading said data transmission rate by said data communications apparatus, wherein said processor circuitry modifies said warning signal as a function of the direction of the data communication traffic being degraded.

6. The apparatus of claim 5, wherein said warning signal generated by said processor circuitry further indicates an amount of data transmission rate degradation as a result of said transmission of said POTS signal impacting said data signal transmission data rate from said data communications apparatus.

7. The apparatus of claim 5, wherein said warning signal generated by said processor circuitry further indicates an elapsed time period of the degradation of said data signal transmission rate as a result of said transmission of said POTS signal impacting said data signal transmission data rate from said data communications apparatus.

8. The apparatus of claim 5, wherein said warning signal generated by said processor circuitry designates a signal tone.

9. A method for use in data communications equipment, the method comprising the steps of:

detecting an off-hook line condition from a device on a communications line, while said data communications equipment is concurrently transmitting data;

generating a warning signal indicating when transmission of a POTS signal is degrading the data transmission data rate on said communication link by said data communications apparatus;

calculating an elapsed time period of the data transmission rate degradation as a result of said transmission of said POTS signal degrading said data transmission rate by said data communications apparatus;

modifying said warning signal as a function of the elapsed time period of the degradation; and sending said warning signal to the device causing said degrading of the data transmission rate.

10. The method of claim 9, further including the steps of:

calculating the amount of data transmission rate degradation as a result of said transmission of said POTS signal degrading said data transmission rate by said data communications apparatus; and modifying said warning signal as a function of the amount of transmission rate degradation.

11. The method of claim 9, further including the steps of:

calculating the direction of the data communication traffic being degraded as a result of said transmission of said POTS signal degrading said data transmission rate by said data communications apparatus; and modifying said warning signal as a function of direction of the data communication traffic being degraded.

12. A method for use in data communications equipment, the method comprising the steps of:

detecting an off-hook line condition from a device on a communications line, while said data communications equipment is concurrently transmitting data;

generating a warning signal indicating when transmission of a POTS signal is degrading the data transmission data rate on said communication link by said data communications apparatus;

calculating a direction of the data communication traffic being degraded as a result of said transmission of said POTS signal degrading said data transmission rate by said data communications apparatus;

modifying said warning signal as a function of direction of the data communication traffic being degraded; and sending said warning signal to the device causing said off-hook line condition.

13. The method of claim 12, further including the steps of:

calculating the amount of data transmission rate degradation as a result of said transmission of said POTS signal degrading said data transmission rate by said data communications apparatus; and modifying said warning signal as a function of the amount of transmission rate degradation.

14. The method of claim 12, further including the steps of:

calculating the elapsed time period of the data transmission rate degradation as a result of said transmission of said POTS signal degrading said data transmission rate by said data communications apparatus; and modifying said warning signal as a function of the elapsed time period of the degradation.

15. Data communications apparatus comprising:

a means for identifying transmission of a POTS signal concurrently with a transmission of a data signal on a communication link;

a means for generating a warning signal to indicate when transmission of said POTS signal is degrading the data transmission rate of said data signal on said communication link by said data communications apparatus; and a means for calculating a direction of the data communication traffic being degraded as a result of said transmission of said POTS signal degrading said data transmission rate by said data communications apparatus, wherein said generating means utilizes said direction to generate said warning signal.

16. The apparatus of claim 15, further comprising:

a means for calculating an elapsed time period of the degradation as a result of said transmission of said POTS signal degrading said data transmission rate of said data signal by said data communications apparatus; and wherein said generating means also utilizes said elapsed time period to generate said warning signal.

17. The apparatus of claim 15, further comprising:

a means for calculating an average achievable data transmission rate over said communication link as a result of said transmission of said POTS signal degrading said data transmission rate of said data signal by said data communications apparatus; and wherein said generating means also utilizes said average achievable data rate to generate said warning signal.

18. The apparatus of claim 15, wherein said warning signal generated by said generating means designates a signal tone.

19. Data communications apparatus comprising:

a means for identifying transmission of a POTS signal concurrently with a transmission of a data signal on a communication link;

a means for generating a warning signal to indicate when transmission of said POTS signal is degrading the data transmission rate of said data signal on said communication link by said data communications apparatus; and a means for calculating an elapsed time period of the degradation as a result of said transmission of said POTS signal degrading said data transmission rate of said data signal by said data communications apparatus, wherein said generating means utilizes said elapsed time period to generate said warning signal.

20. The apparatus of claim 19, further comprising:

a means for calculating an average achievable data transmission rate over said communication link as a result of said transmission of said POTS signal degrading said data transmission rate of said data signal by said data communications apparatus; and wherein said generating means also utilizes said average achievable data rate to generate said warning signal.

21. The apparatus of claim 19, further comprising:

a means for calculating a direction of the data communication traffic being degraded; and wherein said generating means also utilizes said direction of the data communication traffic being degraded to generate said warning signal.

22. The apparatus of claim 19, wherein said warning signal generated by said generating means designates a signal tone.

23. A computer program product for directing a data communications apparatus generation of a warning signal, said program product comprising:

a computer readable recording medium;

a means recorded on the medium for directing the data communications apparatus to identify when a transmission of a POTS signal is degrading the data transmission rate of a data signal on said communication link by said data communications apparatus;

a means recorded on the medium, responsive to the means for directing, for calculating the direction of the data signal being degraded as a result of said transmission of said POTS signal impacting said data transmission rate of said data signal by said data communications apparatus; and a means recorded on the medium for generating said warning signal indicating that said POTS signal is degrading said data transmission rate of said data signal on said communication link, wherein said warning signal generating means modifies said warning signal a function of the direction of the data communication traffic being degraded.

24. The computer program product of claim 23, wherein the means for directing includes:

a first routine means, responsive to the means for directing, for testing, impedance of said data communications link for POTS Off-hook conditions.

25. The computer program product of claim 23, further comprising,:

a second routine means, responsive to the means for directing, for calculating an amount of transmission rate degradation as a result of said transmission of said POTS signal impacting said data transmission rate of said data signal by said data communications apparatus; and modifying said warning signal as a function of the amount of transmission rate degradation.

26. The computer program product of claim 23, further comprising:

a third routine means, responsive to the means for directing, for calculating an elapsed time period of the degradation as a result of said transmission of said POTS signal impacting said data transmission rate of said data signal by said data communications apparatus; and modifying said warning signal as a function of the elapsed time period of the degradation.

27. The computer program product of claim 23, wherein the means for generating includes:

a fourth routine means, responsive to the means for generating, for transmitting said warning signal indicating degradation of said data signal of said data transmission rate to a POTS device generating said POTS signal.

28. A computer program product for directing a data communications apparatus generation of a warning signal, said program product comprising:

a computer readable recording medium;

a means recorded on the medium for directing the data communications apparatus to identify when a transmission of a POTS signal is degrading the data transmission rate of a data signal on said communication link by said data communications apparatus;

a means recorded on the medium, responsive to the means for directing, for calculating an elapsed time period of the degradation as a result of said transmission of said POTS signal impacting said data transmission rate of said data signal by said data communications apparatus; and a means recorded on the medium for generating said warning signal indicating that said POTS signal is degrading said data transmission rate of said data signal on said communication link, wherein said warning signal generating means modifies said warning signal as a function of the elapsed time period of the degradation.

29. The computer program product of claim 28, wherein the means for directing includes:

a first routine means, responsive to the means for directing, for testing impedance of said data communications link for POTS Off-hook conditions.

30. The computer program product of claim 28, further comprising:

a second routine means, responsive to the means for directing, for calculating an amount of transmission rate degradation as a result of said transmission of said POTS signal impacting said data transmission rate of said data signal by said data communications apparatus; and modifying said warning signal as a function of the amount of transmission rate degradation.

31. The computer program product of claim 28, further comprising:

a third routine means, responsive to the means for directing, for calculating the direction of the data signal being degraded as a result of said transmission of said POTS signal impacting said data transmission rate of said data signal by said data communications apparatus; and modifying said warning signal as a function of the direction of the data communication traffic being degraded.

32. The computer program product of claim 28, wherein the means for generating includes:

a fourth routine means, responsive to the means for generating, for transmitting said warning signal indicating degradation of said data signal of said data transmission rate to a POTS device generating said POTS signal.

* * * * *